US012397685B2

(12) United States Patent
Shin et al.

(10) Patent No.: US 12,397,685 B2
(45) Date of Patent: Aug. 26, 2025

(54) APPARATUS AND METHOD FOR CONTROLLING OCCUPANT CUSTOMIZED SEAT

(71) Applicant: HYUNDAI MOBIS CO., LTD., Seoul (KR)

(72) Inventors: Ji Soo Shin, Yongin-si (KR); Shin Jik Lee, Hwaseong-si (KR); Hyun Jun An, Gunpo-si (KR); Tae Hun Kim, Seongnam-si (KR); Sung Joon Ahn, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 73 days.

(21) Appl. No.: 18/414,745

(22) Filed: Jan. 17, 2024

(65) Prior Publication Data

US 2024/0375557 A1 Nov. 14, 2024

(30) Foreign Application Priority Data

May 10, 2023 (KR) .......................... 10-2023-0060341

(51) Int. Cl.
*B60N 2/02* (2006.01)
*B60N 2/26* (2006.01)
(Continued)

(52) U.S. Cl.
CPC ......... *B60N 2/0296* (2013.01); *B60N 2/0226* (2023.08); *B60N 2/0279* (2023.08);
(Continued)

(58) Field of Classification Search
CPC ... B60N 2/0278; B60N 2/0023; B60N 2/0279
See application file for complete search history.

(56) References Cited

U.S. PATENT DOCUMENTS 6,490,515 B1 *  12/2002  Okamura .......... B60R 21/01516
701/45
10,052,982 B1 *  8/2018  Danley ................ B60N 2/2878
(Continued)

FOREIGN PATENT DOCUMENTS

WO   WO 2019/172484 A1   9/2019

OTHER PUBLICATIONS

Extended European search report issued on Jul. 9, 2024, in counterpart European Patent Application No. 24154302.4 (6 pages).

*Primary Examiner* — Long T Tran
(74) *Attorney, Agent, or Firm* — NSIP Law

(57) ABSTRACT

An occupant customized seat control apparatus and method are provided. The method includes recognizing, by a camera, an occupant that approaches a vehicle, controlling a display to move based on a height of the recognized occupant, determining whether the recognized occupant is an infant, and when the recognized occupant is determined to be an infant, determining whether a booster seat needs to be controlled based on the height of the recognized occupant, and when at least one of the booster seat, a footrest, or the combination thereof needs to be controlled, converting a value of the recognized height into a booster seat actuator movement amount value, and controlling the booster seat to move based on the converted actuator movement amount value.

12 Claims, 9 Drawing Sheets

| HEIGHT (Cm) | A. ACTUATOR MOVEMENT AMOUNT (mm) | B. INCREASE IN HEIGHT (mm) |
|---|---|---|
| 105-120 | 100 | 86 |
| 125-130 | 80 | 68.8 |
| 130-140 | 60 | 51.6 |
| 140-150 | 40 | 34.4 |

(51) Int. Cl.
*E05F 15/73* (2015.01)
*G06V 20/58* (2022.01)

(52) U.S. Cl.
CPC ............... *B60N 2/26* (2013.01); *E05F 15/73* (2015.01); *G06V 20/58* (2022.01); *E05F 2015/763* (2015.01); *E05F 2015/767* (2015.01); *E05Y 2900/531* (2013.01)

(56) References Cited

U.S. PATENT DOCUMENTS

| | | | |
|---|---|---|---|
| 11,498,500 B1* | 11/2022 | Pertsel ................. | G06V 40/103 |
| 2015/0055678 A1* | 2/2015 | Kawata .................. | G01S 17/04 |
| | | | 374/121 |
| 2016/0023579 A1* | 1/2016 | Balensiefer .......... | B60N 2/2806 |
| | | | 297/250.1 |
| 2018/0281627 A1* | 10/2018 | Ali ....................... | B60N 2/0022 |
| 2019/0009695 A1* | 1/2019 | Schonfeld ............. | B60N 2/0292 |
| 2020/0269795 A1* | 8/2020 | Angermayer ........... | B60R 11/04 |
| 2021/0206295 A1 | 7/2021 | Quintao Severgnini et al. | |
| 2022/0161750 A1* | 5/2022 | Thomas ............ | B60R 21/01566 |

\* cited by examiner

| HEIGHT (Cm) | A. ACTUATOR MOVEMENT AMOUNT (mm) | B. INCREASE IN HEIGHT (mm) |
| --- | --- | --- |
| 105-120 | 100 | 86 |
| 125-130 | 80 | 68.8 |
| 130-140 | 60 | 51.6 |
| 140-150 | 40 | 34.4 |

APPARATUS AND METHOD FOR CONTROLLING OCCUPANT CUSTOMIZED SEAT

CROSS-REFERENCE TO RELATED APPLICATION(S)

This application claims the benefit under 35 U.S.C. § 119 to Korean Application No. 10-2023-0060341, filed on May 10, 2023, in the Korean Intellectual Property Office, the disclosure of which is incorporated by reference for all purposes.

BACKGROUND

1. Field

Embodiments may be applied to an autonomous vehicle of all fields, and more particularly, to a vehicle system of infant boarding, for example.

2. Discussion of Related Art

Society of Automotive Engineers (SAE), the American Society of Automotive Engineers, divides autonomous driving levels into a total of six levels, from level 0 to level 5, as follows, for example.

Level 0 (no automation) is a stage in which an occupant controls and is responsible for all aspects of driving. An occupant drives a vehicle at all times, and a system of an autonomous vehicle only performs an auxiliary function such as emergency notification. Level 0 is a stage in which a subject of driving control is a human, and humans are also responsible for detecting variables and driving during driving.

Level 1 (driver assistance) is a stage in which an occupant is assisted through adaptive cruise control and lane keeping functions. The system assists the occupant by maintaining a vehicle speed and a distance between vehicles and maintaining lanes. A subject of driving control is a human and the system, and both humans and the system are responsible for detecting variables and driving during driving Level 2 (partial automation) is a stage in which an autonomous vehicle is capable controlling steering, acceleration, and deceleration of an autonomous vehicle simultaneously with a human for a certain period of time within specific conditions. Assisted driving of steering in gentle curves and maintaining a distance with a forward vehicle is possible. However, Level 2 is a level in which humans are responsible for detecting variables and driving during driving, and an occupant always needs to monitor a driving situation and needs to immediately intervene in driving in a situation that the system is not capable of recognizing.

Level 3 (conditional automation) is a stage in which the system is responsible for driving in a section with specific conditions, such as a highway, and an occupant intervenes only in case of danger. The system is responsible for driving control and detecting variables during driving, and unlike level 2, the above monitoring is not required. However, when the requirements of the system are exceeded, the system requests immediate intervention from the occupant.

Level 4 (high automation) is a stage in which autonomous driving on most roads is possible. The system is responsible for both driving control and driving. There is no need for occupant intervention on most roads except in restricted situations. However, in certain conditions such as bad weather, occupant intervention may be requested, and thus a human-assisted driving control device is necessary.

Level 5 (full automation) is a stage in which an occupant is not required and driving is possible with only an occupant. The occupant simply inputs information on a destination, and the system is responsible for driving in all conditions. At level 5, control devices for steering, acceleration, and deceleration of autonomous vehicles are unnecessary.

The existing vehicle seats require a booster seat for increasing the height of a seat cushion when a short child gets into the vehicle, and when the booster seat is not installed on a seat, there is a problem that a separate booster seat needs to be purchased and installed.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

It will be appreciated by one of ordinary skill in the art that the objects that could be achieved with the present disclosure are not limited to what has been particularly described hereinabove and the above and other objects that the present disclosure could achieve will be more clearly understood from the following detailed description.

In one general aspect of the disclosure, an occupant customized seat control method includes: recognizing, by a camera, an occupant that approaches a vehicle; controlling a display to move based on a height of the recognized occupant; determining whether the recognized occupant is an infant; and when the recognized occupant is determined to be an infant, determining whether a booster seat needs to be controlled based on the height of the recognized occupant; and when at least one of the booster seat, a footrest, or the combination thereof needs to be controlled, converting a value of the recognized height into a booster seat actuator movement amount value, and controlling the booster seat to move based on the converted actuator movement amount value.

The occupant customized seat control method may further include, when the booster seat moves up, controlling the footrest to move forward.

The occupant customized seat control method may further include transmitting an occupant guidance image to the display, controlling a door of the vehicle to be opened, and when the occupant boards the vehicle and sits on a seat, recognizing the occupant through an ultrasonic sensor and controlling the door to be closed.

The occupant customized seat control method may further include controlling at least one of a seat back, a booster seat, a footrest, a leg rest, or any combination thereof, through a seat control button, by the occupant.

The occupant customized seat control method may further include applying a movement amount of the booster seat for each preset stage in response to a value of the recognized height.

In another general aspect of the disclosure, an occupant customized seat control apparatus includes: a camera configured to recognize an occupant that approaches a vehicle; a display configured to display a profile authentication procedure for the occupant; an occupant customized seat disposed within the vehicle and including at least one of a booster seat, a footrest, a seat belt, a seat back, a leg rest, an ultrasonic sensor, a seat control button, or any combination thereof; an actuator unit including a display actuator configured to adjust heights of the camera and the display, and a booster seat actuator configured to adjust a height of the booster seat; and a controller configured to: control the display to move based on a height of the recognized occupant; determine whether the recognized occupant is an infant; when the occupant is determined to be an infant, determine whether a booster seat needs to be controlled, based on the recognized height; and when at least one of the booster seat, a footrest, or the combination thereof needs to be controlled, convert a value of the recognized height into a booster seat actuator movement amount value, and control the booster seat to move based on the converted actuator movement amount value.

The controller may be further configured to control the footrest to move forward when the booster seat moves up.

The controller may be further configured to: transmit an occupant guidance image to the display; control a door of the vehicle to be opened; and when the occupant boards the vehicle and sits on a seat, recognize the occupant through an ultrasonic sensor and control the door to be closed.

The controller may be further configured to control at least one of a seat back, a booster seat, a footrest, a leg rest, or any combination thereof through a seat control button, by the occupant.

The controller may be further configured to apply a movement amount of the booster seat for each preset stage in response to a value of the recognized height.

The controller may be further configured to automatically move the booster seat depending on the height of an infant by automatically setting the seat through an external authentication.

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
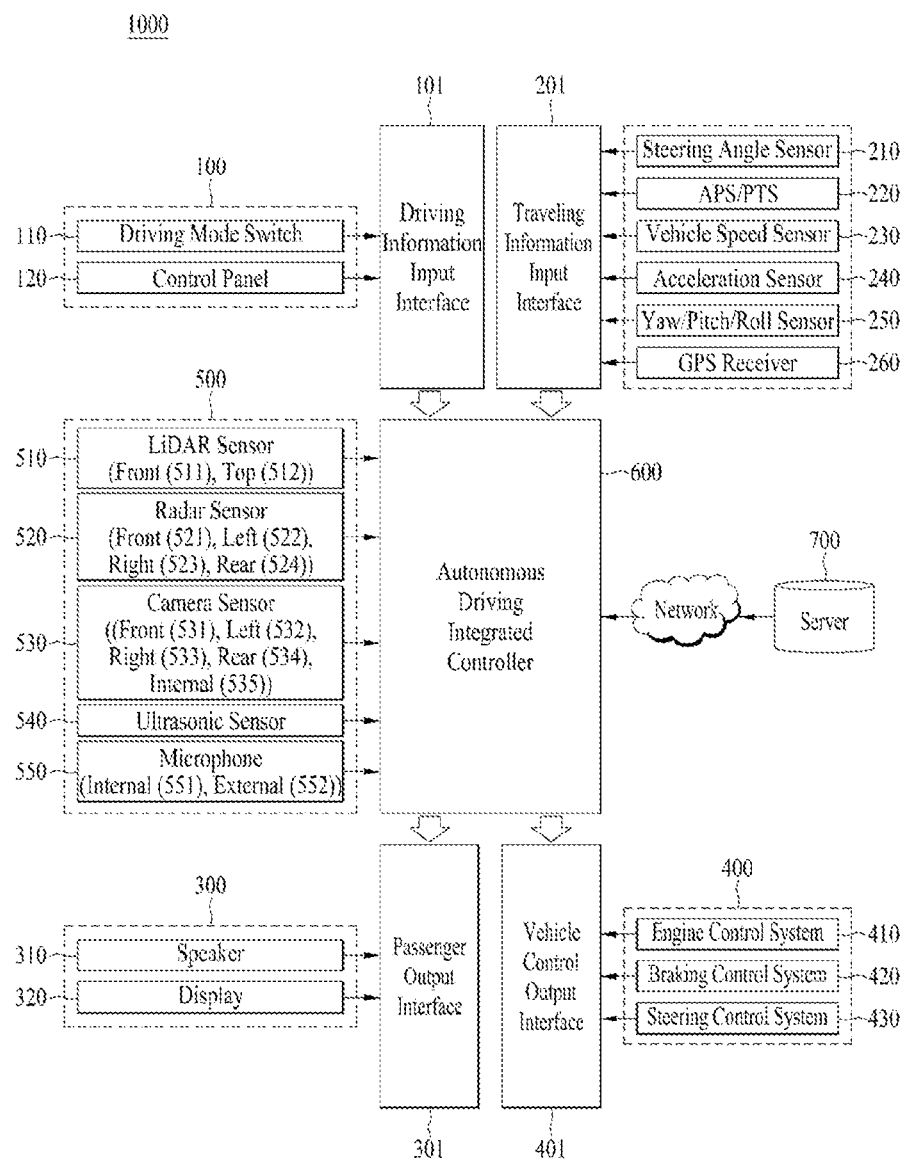
FIG. 1 is an overall block diagram of an autonomous driving control system to which an autonomous driving apparatus according to any one of embodiments of the present disclosure is applicable.
Figure 2:
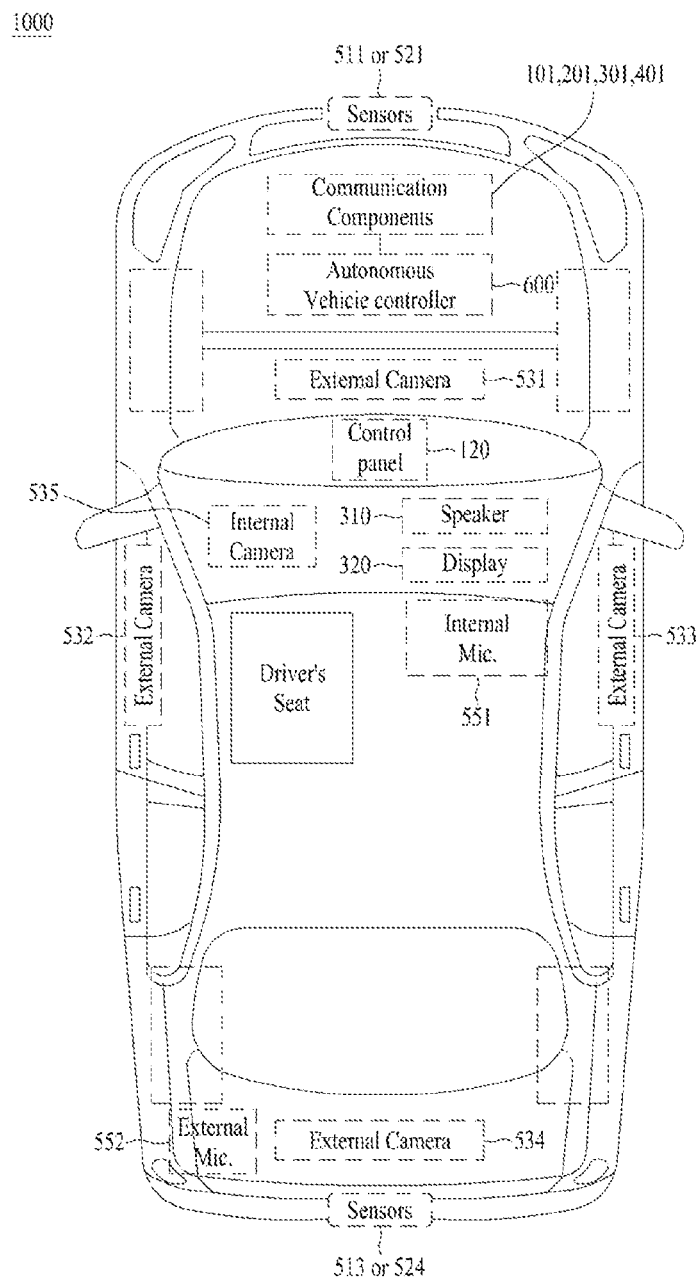
FIG. 2 is a diagram illustrating an example in which an autonomous driving apparatus according to any one of embodiments of the present disclosure is applied to an autonomous vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
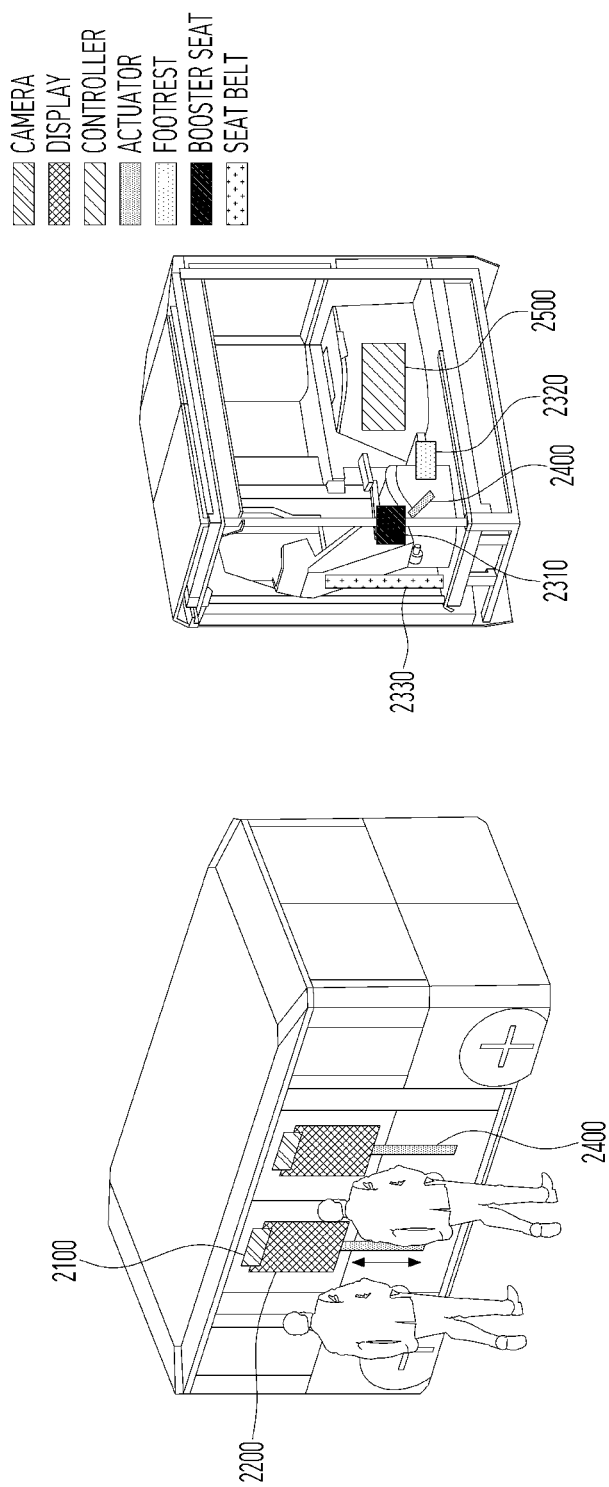
FIGS. 3 and 4 are diagrams for explaining an occupant customized seat control apparatus according to an embodiment of the present disclosure.
Figure 4:
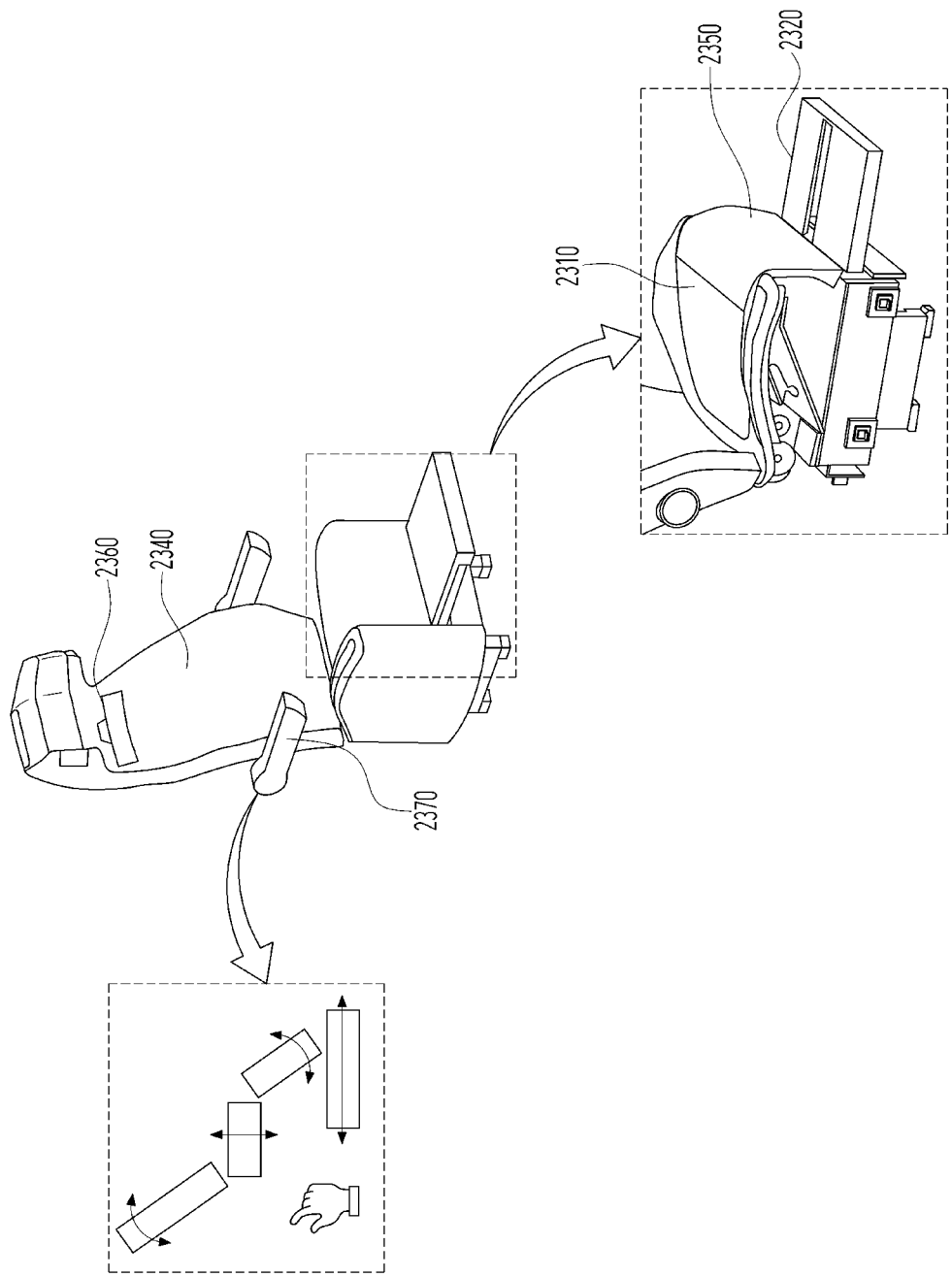

FIGS. 3 and 4 are diagrams for explaining an occupant customized seat control apparatus 2000 according to an embodiment of the present disclosure.

Referring to FIGS. 3 to 4, the occupant customized seat control apparatus 2000 may include a camera 2100, a display 2200, an occupant customized seat 2300, an actuator unit 2400, and a controller 2500.

The camera 2100 may recognize a height of an occupant when the occupant approaches from the outside in a standby state. The camera 2100 may transmit recognized occupant information to a control device. The camera 2100 may be placed on a glass portion of a vehicle door or an upper end of the display 2200.

The display 2200 may display a profile authentication process for the occupant. The display 2200 may be placed on the glass portion of the vehicle door.

The occupant customized seat 2300 may include a booster seat 2310, a footrest 2320, a seat belt 2330, a seat back 2340, a leg rest 2350, an ultrasonic sensor 2360, and a seat control button 2370.

The booster seat 2310 may be a seat that moves up and down in accordance with the height of the occupant recognized through the camera 2100. The booster seat 2310 may be a bottom cushion portion of a seat that touches the buttocks of the occupant when seated.

The footrest 2320 may be a footrest for a child occupant to easily get on the seat when boarding a vehicle.

The seat belt 2330 may be a belt that the occupant fastens after boarding the vehicle and before driving.

The seat back 2340 may be a reclining seatback.

The leg rest 2350 may rotate in its entirety in response to reclining of the seat back 2340.

The ultrasonic sensor 2360 may be mounted on the seat back 2340, and may recognize the occupant and detect the occupant in the customized seat 2300.

The seat control button 2370 may be disposed on a seat side cover, and may include a button to control the booster seat 2310, a button to control the footrest 2320, a button to control the seat back 2340, and a button to control the leg rest 2350.

The actuator unit 2400 may include a display actuator that adjusts the heights of the camera 2100 and the display 2200, and a booster seat actuator that adjusts the height of the booster seat 2310. The display actuator may be disposed at a lower end of the display 2200. The booster seat actuator may be disposed at a lower end of the booster seat 2310.

The controller 2500 may control at least one of the camera 2100, the display 2200, and the occupant customized seat 2300. The controller 2500 may be disposed in a mounting on a vehicle body inside an interior trim, but the location of the controller 2500 is not limited thereto.

The controller 2500 may receive information transmitted from the camera 2100 and transmit the information back to the booster seat 2310.

The controller 2500 may control the camera 2100 to recognize the occupant close to the vehicle.

The controller 2500 may control the display 2200 to move based on the height of the recognized occupant.

The controller 2500 may determine whether the recognized occupant is an infant.

When the occupant is an infant, the controller 2500 may determine whether control of the booster seat 2310 is necessary based on the recognized height.

When control of at least one of the booster seat 2310 and the footrest 2320 is required, the controller 2500 may convert a recognized height value into a movement amount value of the booster seat actuator, and control the booster seat 2310 to move the booster seat 2310 based on the converted actuator movement amount value.

For example, when the booster seat 2310 moves upward, the controller 2500 may control the footrest 2320 to move forward.

The controller 2500 may perform control to transmit an occupant guidance image to the display 2200 and open the vehicle door.

When the occupant gets on board and sits on the seat, the controller 2500 may recognize the occupant through the ultrasonic sensor 2360 and control the door to close.

The controller 2500 allows the occupant to control at least one of the seat back 2340, the booster seat 2310, the footrest 2320, and the leg rest 2350 through the seat control button 2370. At this time, the controller 2500 may apply a movement amount of the booster seat 2310 for each preset stage in response to a value of the recognized height.

Figure 5:
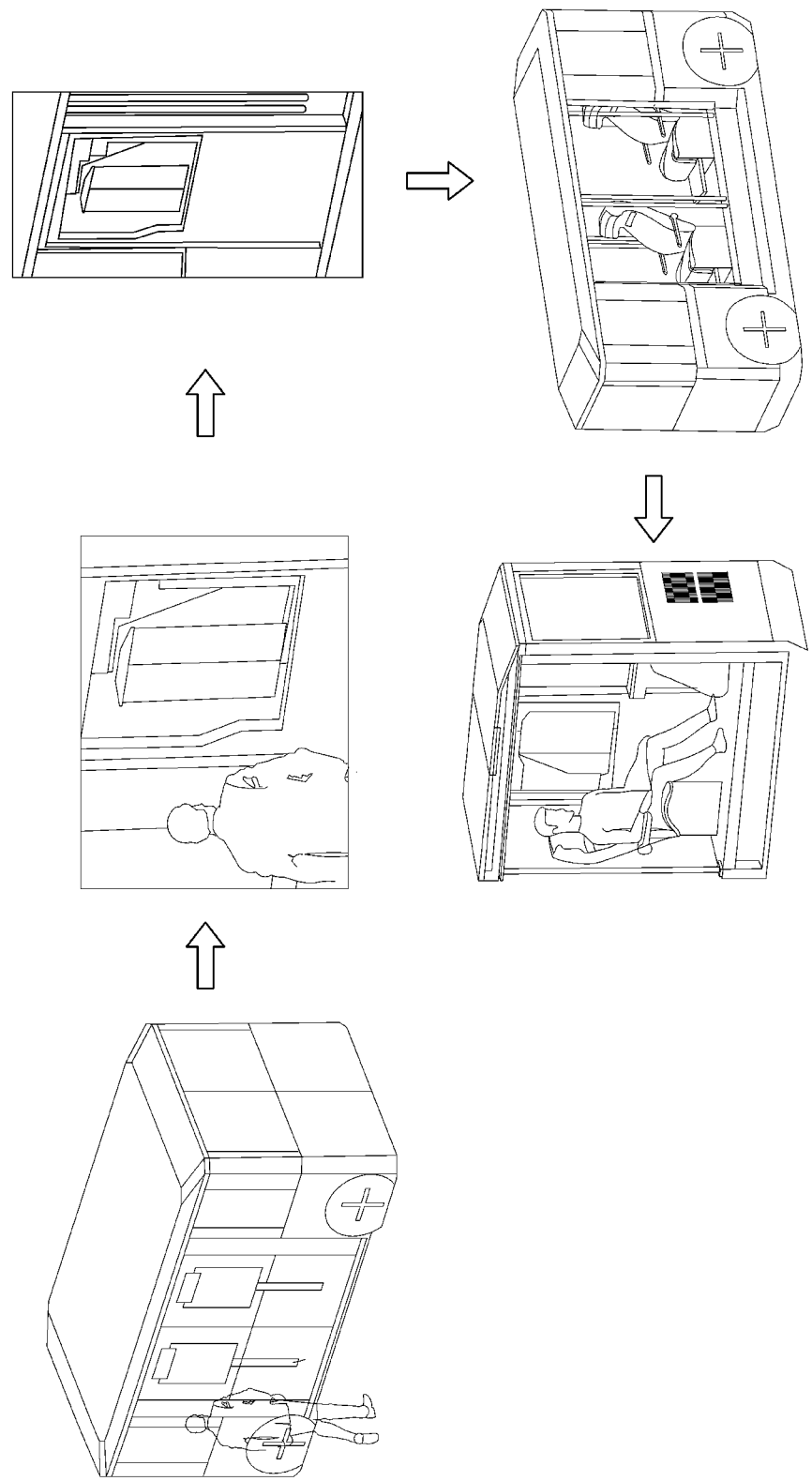
FIGS. 5 to 7 are diagrams for explaining an operation of an occupant customized seat control apparatus according to embodiments of the present disclosure.
Figure 6:
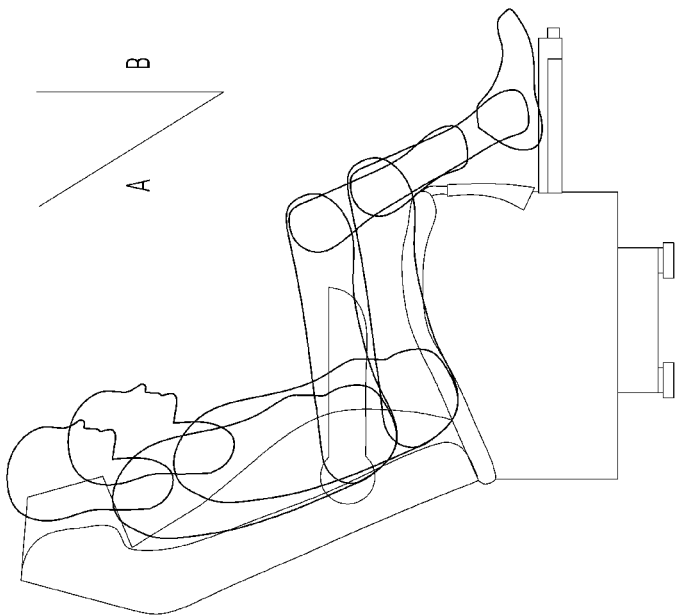
Figure 7:
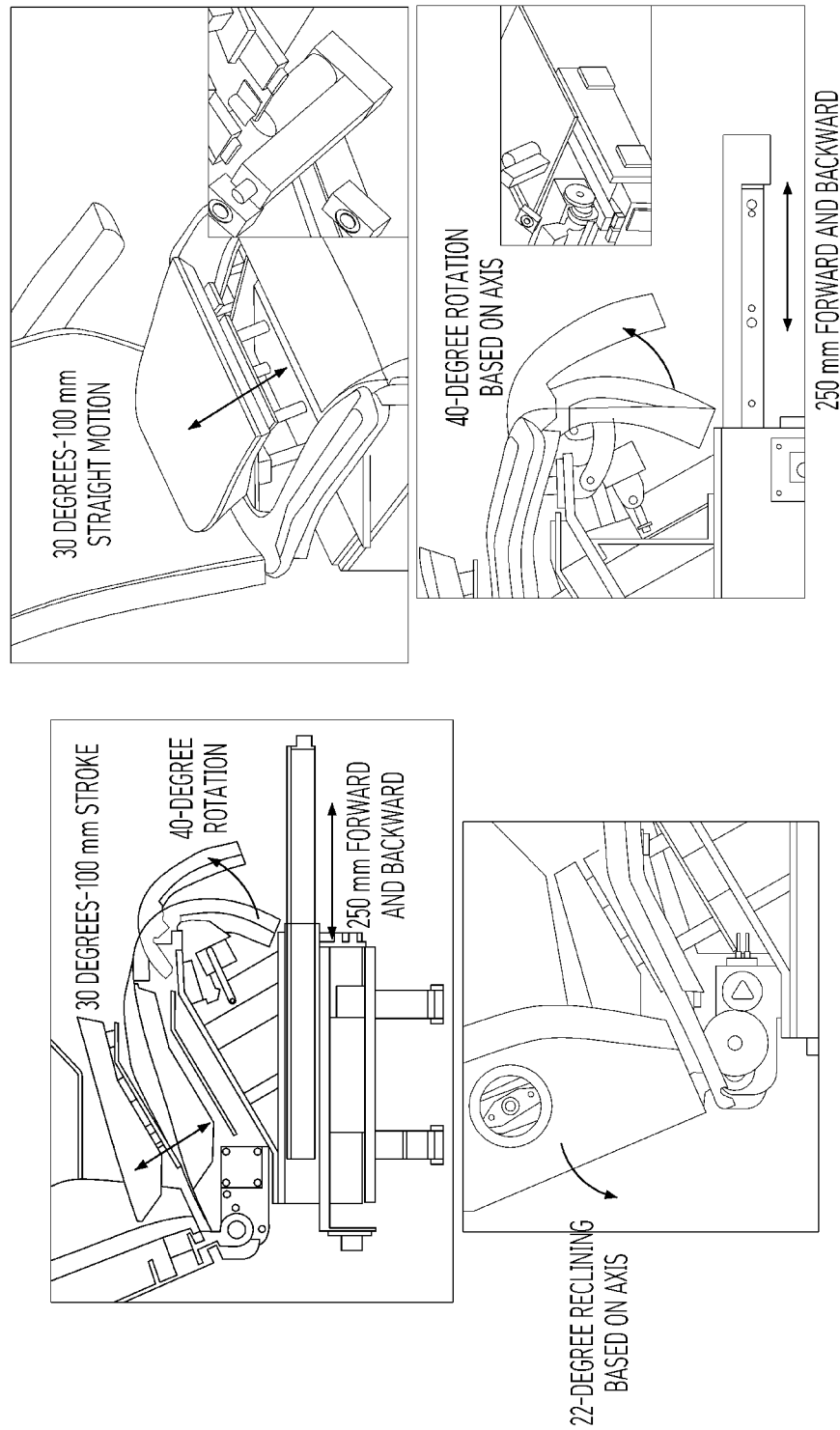

FIGS. 5 to 7 are diagrams for explaining an operation of an occupant customized seat control apparatus according to embodiments of the present disclosure.

Referring to FIG. 5, when an occupant approaches a stopped vehicle, the camera 2100 may measure a height of the occupant and transmit a value to the controller 2500. The controller 2500 may transmit a movement amount value corresponding to a value of the height of the occupant to the display actuator.

The display actuator may receive the movement amount value and control the display 2200 to move up and down according to the height of the occupant.

Then, the controller 2500 may calculate a movement amount of the booster seat actuator in response to the value of the height of the occupant. Then, the controller 2500 may transmit the movement amount value to the booster seat actuator.

Referring to FIG. 6, the movement amount of the booster seat 2310 may be obtained by converting a value of the height of the occupant recognized by the camera 2100 and may be applied for each operation.

For example, when the height of the occupant is 105 cm to 102 cm, the movement amount of the booster seat actuator is 100 mm, and therefore, the occupant may be raised by 86 mm in height.

For example, when the height of the occupant is 120 cm to 130 cm, the movement amount of the booster seat actuator is 100 mm, and therefore, the occupant may be raised by 68.8 mm in height.

For example, when the height of the occupant is 130 cm to 140 cm, the movement amount of the booster seat actuator is 100 mm, and therefore, the occupant may be raised by 54.6 mm in height.

For example, when the height of the occupant is 140 cm to 150 cm, the movement amount of the booster seat actuator is 100 mm, and therefore, the occupant may be raised by 34.4 mm in height.

Referring back to FIG. 5, an occupant guidance image may be transmitted to the display 2200, and a vehicle door may be opened. While the occupant guidance image is transmitted to the display 2200 and the door is opened, the actuator unit 2400 may be operated in advance for presetting of the occupant customized seat 2300.

When the occupant is an adult, the occupant customized seat 2300 may be set to a default mode, and when the occupant is an infant, the booster seat 2310 may rise and the footrest 2320 may protrude forward.

After the occupant boards the vehicle, when the occupant sits on the customized seat 2300, the ultrasonic sensor 2360 may recognize the occupant, and the door may be automatically closed.

Therefore, the occupant sits on the occupant customized seat 2300 that matches his or her height and manually fastens the seat belt 2330, and through the seat control button 2370, the seat back 2340, the booster seat 2310, the footrest 2320, The leg rest 2350 may be controlled selectively.

Referring to FIG. 7, the booster seat 2310 may operate in a straight motion up to 100 mm in a direction of 30 degrees based on the axis. The seat back 2340 may be reclined up to 20 degrees based on the axis. The leg rest 2350 may perform rotational movement up to 40 degrees based on the axis. The footrest 2320 may move forward up to 250 mm.

Figure 8:
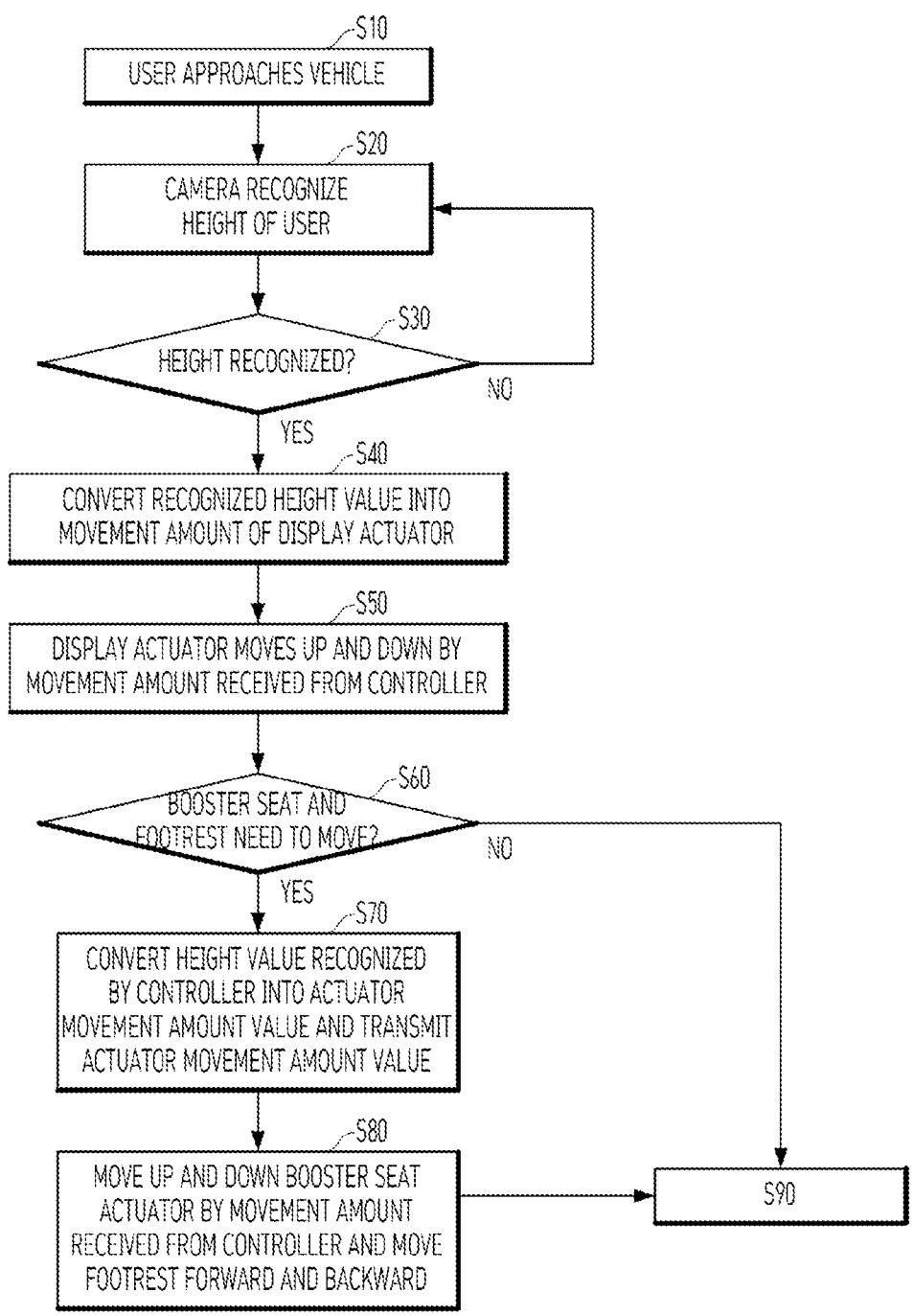
FIGS. 8 and 9 are flowcharts for explaining a vehicle boarding operation of a wheelchair according to embodiments of the present disclosure.
Figure 9:
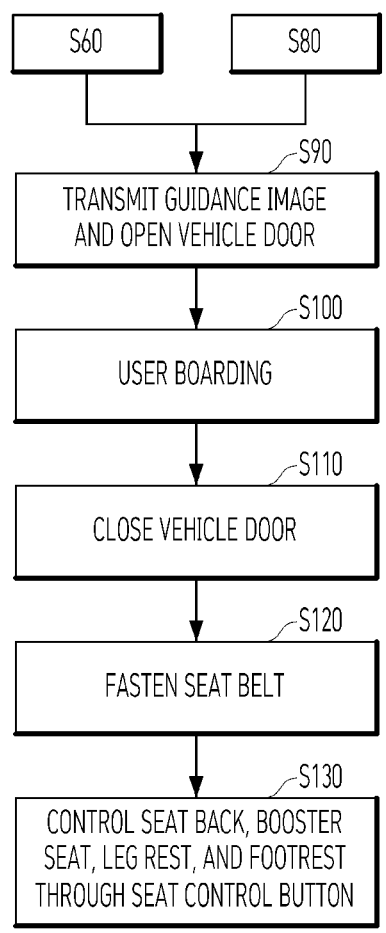

FIGS. 8 and 9 are flowcharts for explaining a vehicle boarding operation of a wheelchair according to embodiments of the present disclosure.

Referring to FIGS. 8 and 9, in the occupant customized seat control apparatus 2000, when an occupant approaches a vehicle (S10), the camera 2100 may move to recognize the height of the occupant (S20).

After operation S20, the occupant customized seat control apparatus 2000 may determine whether the height of the occupant is recognized (S30).

After operation S30, when recognizing the height of the occupant, the occupant customized seat control apparatus 2000 may transmit a recognized height value to a controller and the controller may convert the transmitted value into a movement amount value of a display actuator (S40).

After operation S40, the occupant customized seat control apparatus 2000 may determine whether the occupant is an infant, and when the occupant is an infant, the occupant customized seat control apparatus 2000 may determine whether at least one of the booster seat 2310 and the footrest 2320 needs to be moved and determine whether the display 2200 needs to be moved up and down (S50).

After operation S50, the occupant customized seat control apparatus 2000 may determine whether at least one of the booster seat 2310 and the footrest 2320 needs to be moved, and when the display 2200 needs to be moved up and down, the occupant customized seat control apparatus 2000 may convert a value of the height recognized by the controller into a movement amount value of the actuator and transmit the movement amount value (S60).

After operation S60, the occupant customized seat control apparatus 2000 may control the booster seat actuator to move up and down by the movement amount received from the controller 2500. The occupant customized seat control apparatus 2000 may control the footrest 2320 to protrude forward. The display actuator may be controlled to be moved up by the movement amount received from the controller (S70).

After operation S70, the occupant customized seat control apparatus 2000 may transmit the guidance image to the display 2200 and may perform control to open the vehicle door (S80).

After operation S80, when the occupant boards the vehicle (S90), the occupant customized seat control apparatus 2000 may perform control to close the vehicle door (S100).

After operation S100, when the occupant sits in the vehicle and then fastens the seat belt 2330 (S110), the occupant customized seat control apparatus 2000 may control the seat back 2340, the booster seat 2310, the footrest 2320, and the leg rest 2350 through the seat control button 2370 (S120).

As described above, an exemplary embodiment of the disclosure discloses an occupant customized seat control apparatus that automatically moves a seat depending on the height of an infant by automatically setting a seat through external authentication in an autonomous driving concept.

In other words, the technical spirit of the present disclosure may be applied to the entire autonomous vehicle or only to some components inside the autonomous vehicle. The scope of rights of the present disclosure needs to be determined according to the matters stated in the claims.

According to another aspect of the present disclosure, the aforementioned proposals or operations according to the present disclosure may be provided as a code to be implemented, embodied, or executed by a "computer" (a comprehensive concept including a system on chip (SoC) or microprocessor) or an application, a computer-readable storage medium, or a computer program product, which stores or contains the code, and this also falls within the scope of the present disclosure.

According to any one of embodiments of the present disclosure, there is an effect of ensuring the space and compatibility for adults and children because the booster seat is not always installed.

According to any one of embodiments of the present disclosure, there is an effect of increasing convenience because, even if a separately purchased booster seat is not installed, the booster seat moves up automatically and is usable.

According to any one of embodiments of the present disclosure, there is an effect of increasing convenience because it is possible to preset a profile of an occupant in a designated seat before boarding since the profile is previously authenticated externally.

The effects that are achievable by the present disclosure are not limited to what has been particularly described hereinabove and other advantages not described herein will be more clearly understood by persons skilled in the art from the following description.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Therefore, the present disclosure intends not to limit the embodiments disclosed herein but to give a broadest range matching the principles and new features disclosed herein.

What is claimed is:

1. An occupant customized seat control method comprising:
   recognizing, by a camera, an occupant that approaches a vehicle;
   controlling a display to move based on a height of the recognized occupant;
   determining whether the recognized occupant is an infant; and
   when the recognized occupant is determined to be an infant, determining whether a booster seat needs to be controlled based on the height of the recognized occupant; and
   when at least one of the booster seat, a footrest, or the combination thereof needs to be controlled, converting a value of the recognized height into a booster seat actuator movement amount value, and controlling the booster seat to move based on the converted actuator movement amount value.

2. The occupant customized seat control method of claim 1, further comprising:
   when the booster seat moves up, controlling the footrest to move forward.

3. The occupant customized seat control method of claim 2, further comprising:
   transmitting an occupant guidance image to the display;
   controlling a door of the vehicle to be opened; and
   when the occupant boards the vehicle and sits on a seat, recognizing the occupant through an ultrasonic sensor and controlling the door to be closed.

4. The occupant customized seat control method of claim 3, further comprising:
   controlling at least one of a seat back, a booster seat, a footrest, a leg rest, or any combination thereof, through a seat control button, by the occupant.

5. The occupant customized seat control method of claim 1, further comprising:
   applying a movement amount of the booster seat for each preset stage in response to a value of the recognized height.

6. The occupant customized seat control method of claim 1, further comprising:
   automatically moving the booster seat depending on the height of an infant by automatically setting the seat through an external authentication.

7. An occupant customized seat control apparatus comprising:
   a camera configured to recognize an occupant that approaches a vehicle;
   a display configured to display a profile authentication procedure for the occupant;
   an occupant customized seat disposed within the vehicle and including at least one of a booster seat, a footrest, a seat belt, a seat back, a leg rest, an ultrasonic sensor, a seat control button, or any combination thereof;
   an actuator unit including a display actuator configured to adjust heights of the camera and the display, and a booster seat actuator configured to adjust a height of the booster seat; and
   a controller configured to:
      control the display to move based on a height of the recognized occupant;
      determine whether the recognized occupant is an infant;
      when the recognized occupant is determined to be an infant, determine whether a booster seat needs to be controlled, based on the height of the recognized occupant; and
      when at least one of the booster seat, a footrest, or the combination thereof needs to be controlled, convert a value of the recognized height into a booster seat actuator movement amount value, and control the booster seat to move based on the converted actuator movement amount value.

8. The occupant customized seat control apparatus of claim 7, wherein the controller is further configured to control the footrest to move forward when the booster seat moves up.

9. The occupant customized seat control apparatus of claim 8, wherein the controller is further configured to:
- transmit an occupant guidance image to the display;
- control a door of the vehicle to be opened; and
- when the occupant boards the vehicle and sits on a seat, recognize the occupant through an ultrasonic sensor and control the door to be closed.

10. The occupant customized seat control apparatus of claim 9, wherein the controller is further configured to control at least one of a seat back, a booster seat, a footrest, a leg rest, or any combination thereof through a seat control button, by the occupant.

11. The occupant customized seat control apparatus of claim 7, wherein the controller is further configured to apply a movement amount of the booster seat for each preset stage in response to a value of the recognized height.

12. The occupant customized seat control apparatus of claim 7, wherein the controller is further configured to automatically move the booster seat depending on the height of an infant by automatically setting the seat through an external authentication.

* * * * *